United States Patent
Kawasaki

(10) Patent No.: US 10,042,590 B2
(45) Date of Patent: Aug. 7, 2018

(54) INFORMATION PROCESSING APPARATUS METHOD FOR CONTROLLING INFORMATION PROCESSING APPARATUS AND STORAGE MEDIUM

(71) Applicant: CANON KABUSHIKI KAISHA, Tokyo (JP)

(72) Inventor: Hiroki Kawasaki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/018,678

(22) Filed: Feb. 8, 2016

(65) Prior Publication Data

US 2016/0154617 A1     Jun. 2, 2016

Related U.S. Application Data

(63) Continuation of application No. 14/185,788, filed on Feb. 20, 2014, now Pat. No. 9,286,009.

(30) Foreign Application Priority Data

Feb. 22, 2013    (JP) ................................ 2013-033423

(51) Int. Cl.
     *G06F 3/12*      (2006.01)
     *G06F 21/60*      (2013.01)

(52) U.S. Cl.
     CPC .......... *G06F 3/1222* (2013.01); *G06F 3/1236* (2013.01); *G06F 3/1238* (2013.01); *G06F 3/1292* (2013.01); *G06F 21/608* (2013.01)

(58) Field of Classification Search
None
See application file for complete search history.

(56) References Cited

U.S. PATENT DOCUMENTS

| | | | | |
|---|---|---|---|---|
| 7,290,067 B2 * | 10/2007 | Fukunaga | ............ | G06F 9/4411 340/12.37 |
| 7,500,026 B2 * | 3/2009 | Fukunaga | ............ | G06F 9/4411 340/12.37 |
| 7,523,224 B2 * | 4/2009 | Fukunaga | ............ | G06F 9/4411 340/12.37 |
| 7,907,292 B2 * | 3/2011 | Suzuki | .................. | G06F 3/1207 358/1.13 |
| 8,077,335 B2 * | 12/2011 | Ookuma | ............ | H04N 1/00347 358/1.13 |

(Continued)

FOREIGN PATENT DOCUMENTS

| | | |
|---|---|---|
| JP | 2004-255603 A | 9/2004 |
| JP | 2008-072368 A | 3/2008 |
| JP | 2013-005095 A | 1/2013 |

*Primary Examiner* — Dung D Tran

(74) *Attorney, Agent, or Firm* — Canon U.S.A., Inc. IP Division

(57) ABSTRACT

A printing apparatus which performs printing processing based on print data, and has a direct wireless communication function, includes a wired interface, a wireless interface, and a control unit. The wired interface receives print data. The wireless interface receives print data by a wireless communication by the direct wireless communication function. The control unit applies, as a condition of a port which can be used in a communication including receiving of print data, a first port condition to a communication by the wired interface, and applies a second port condition to a wireless communication by the direct wireless communication function.

2 Claims, 7 Drawing Sheets

```
┌─────────────────────────────────────────┐
│  PORT SETTING                            │
│  ┌────────────────────────────────────┐ │
│  │  CHECK PERMITTED PORT.              │ │
│  │                                      │ │
│  601─┤ PERMITTED PORT: 80       602    │ │
│  │                                      │ │
│  │     CHANGE PERMITTED PORT: [CHANGE] │ │
│  └────────────────────────────────────┘ │
│  ┌────────────────────────────────────┐ │
│  │  CHECK SPECIAL PERMITTED PORT.      │ │
│  │                                      │ │
│  603─┤ SPECIAL PERMITTED PORT: 890     │ │
│  │                                604   │ │
│  │   CHANGE SPECIAL PERMITTED PORT: [CHANGE] │
│  └────────────────────────────────────┘ │
│      605─[REGISTER]      [RETURN]       │
└─────────────────────────────────────────┘
          600 PORT SETTING SCREEN
```

(56) References Cited

U.S. PATENT DOCUMENTS

| | | | | |
|---|---|---|---|---|
| 8,120,806 B2* | 2/2012 | Park | ............... | H04N 1/00204 |
| | | | | 358/1.13 |
| 8,189,221 B2* | 5/2012 | Matsumoto | ........... | G06F 3/1208 |
| | | | | 358/1.13 |
| 8,605,312 B2* | 12/2013 | Hwang | ................ | G06F 3/1204 |
| | | | | 358/1.15 |
| 8,625,144 B2* | 1/2014 | Takashima | ............ | G06F 3/1205 |
| | | | | 358/1.13 |
| 8,817,785 B2* | 8/2014 | Shouno | .................. | H04L 12/18 |
| | | | | 370/389 |
| 2005/0066072 A1* | 3/2005 | Nakamura | ............ | G06F 3/1203 |
| | | | | 710/8 |
| 2005/0248803 A1* | 11/2005 | Ohara | .................. | G06F 3/1209 |
| | | | | 358/1.15 |
| 2006/0256372 A1* | 11/2006 | Suzuki | ................ | G06F 3/1207 |
| | | | | 358/1.15 |
| 2007/0279666 A1* | 12/2007 | Lee | ...................... | G06F 3/1204 |
| | | | | 358/1.13 |
| 2008/0068644 A1* | 3/2008 | Yanagi | .............. | H04L 29/12113 |
| | | | | 358/1.15 |
| 2009/0204857 A1* | 8/2009 | Yokokura | ........... | H04L 43/0817 |
| | | | | 714/48 |
| 2012/0158839 A1* | 6/2012 | Hassan | ................ | H04W 8/005 |
| | | | | 709/204 |
| 2013/0107316 A1* | 5/2013 | Kwon | .................... | H04L 45/54 |
| | | | | 358/1.15 |
| 2013/0259025 A1* | 10/2013 | Terashita | ................ | H04L 69/18 |
| | | | | 370/351 |
| 2014/0320900 A1* | 10/2014 | Moriya | ................ | G06F 3/1206 |
| | | | | 358/1.15 |

* cited by examiner

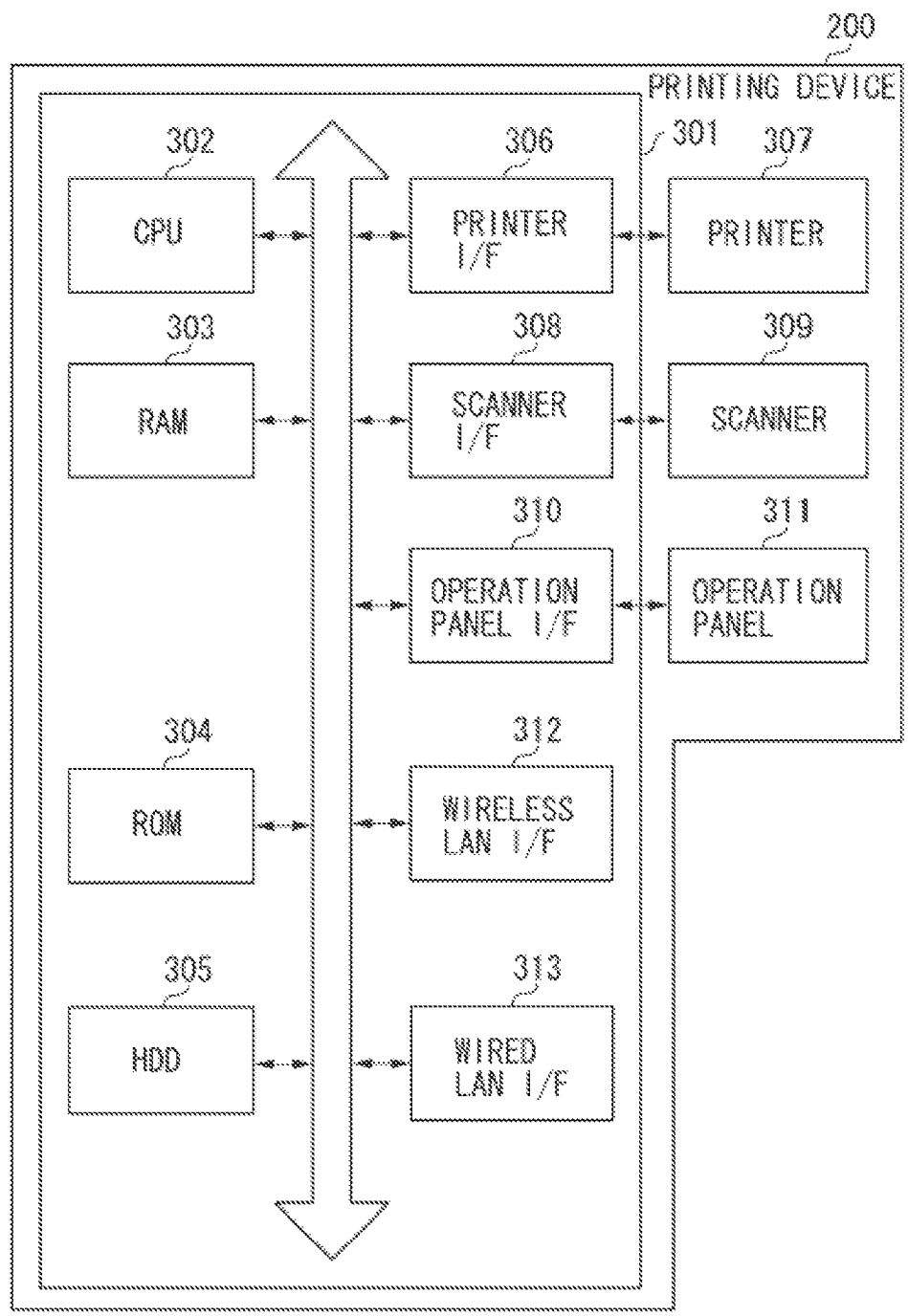

FIG. 4A

```
PORT SETTING
 CHECK PERMITTED PORT.
 PERMITTED PORT: 80                    402
 401  CHANGE PERMITTED PORT: [CHANGE]

403~[REGISTER]      [RETURN]
```
400 PORT SETTING SCREEN

FIG. 4B

```
PORT SETTING

INPUT PERMITTED PORT AFTER CHANGE.    411
PERMITTED PORT AFTER CHANGE: [      ]

[SET]~412
```
410 PORT SETTING SCREEN

600 PORT SETTING SCREEN

610 PORT SETTING SCREEN

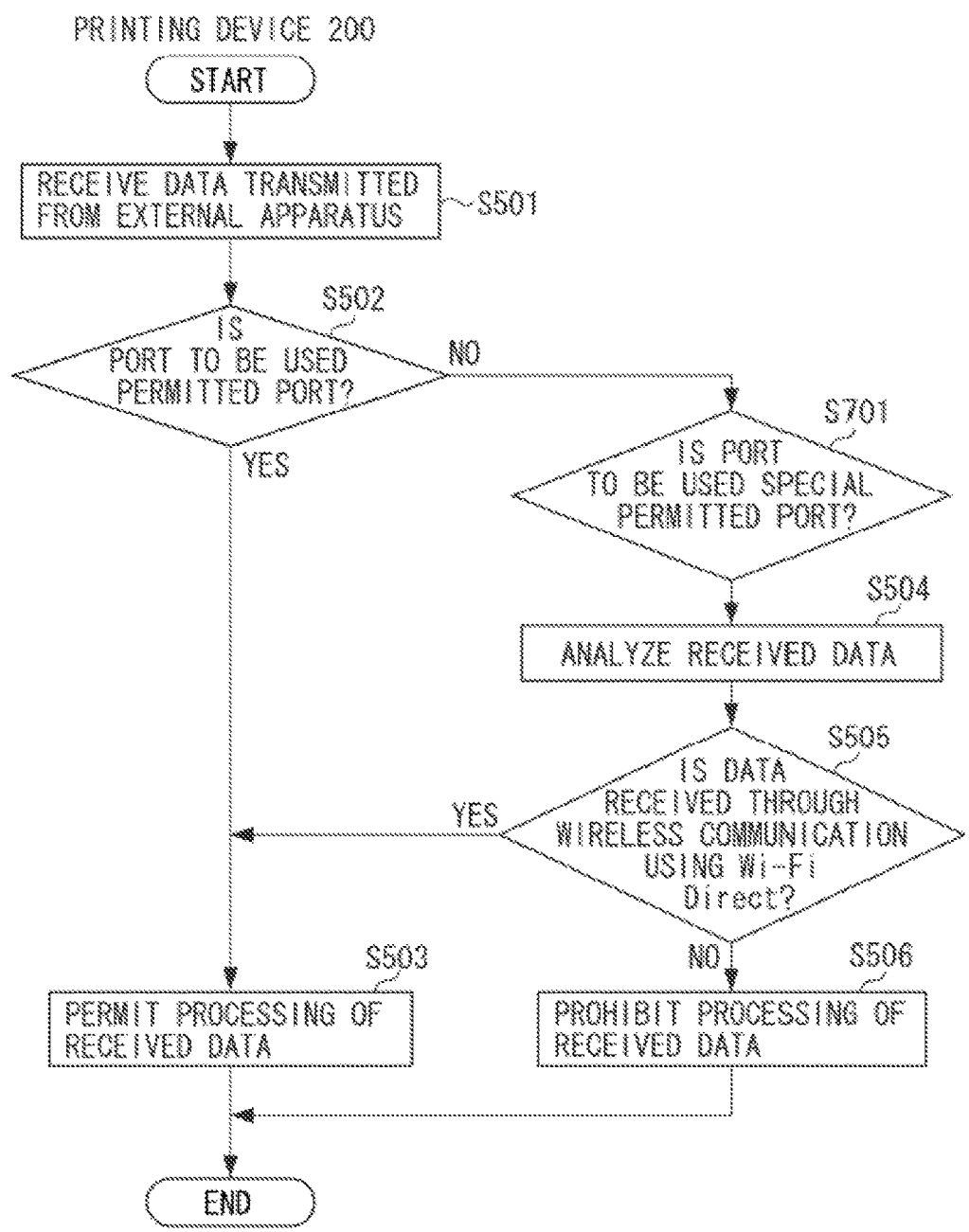

INFORMATION PROCESSING APPARATUS METHOD FOR CONTROLLING INFORMATION PROCESSING APPARATUS AND STORAGE MEDIUM

CROSS REFERENCE TO RELATED APPLICATIONS

The present application is a continuation of U.S. patent application Ser. No. 14/185,788, filed on Feb. 20, 2014, which claims priority from Japanese Patent Application No. 2013-033423, filed Feb. 22, 2013, all of which are hereby incorporated by reference herein in their entirety.

BACKGROUND OF THE INVENTION

Field of the Invention

The present invention relates to an information processing apparatus, a method for controlling the information processing apparatus, and a storage medium.

Description of the Related Art

A standard, Wi-Fi Direct (registered trademark), has been established by the Wi-Fi Alliance. In Wi-Fi Direct, a protocol is defined to determine whether an image processing device, such as a printing device or a personal computer (PC), operates as an access point or a client. By utilizing the protocol, an image forming apparatus as the access point and an image forming apparatus as the client can be automatically determined. Wi-Fi Direct enables direct wireless communications between image processing apparatuses without employing a separately prepared access point.

FIG. 1 is a diagram simply illustrating a processing sequence in Wi-Fi Direct. The printing device and the mobile terminal are each an example of an information processing apparatus supporting Wi-Fi Direct.

First, the printing device and the mobile terminal each search for a device to specify a communication partner in step S101. Once the communication partners are specified through the device search, which will be the access point (Group Owner) and which will be the client (Client) are determined in step S102. The processing in step S102 will be referred to as role determination. In FIG. 1, the printing device is determined as Group Owner and the mobile terminal is determined as Client as a result of the role determination.

Next, the printing device as Group Owner provides a parameter for establishing a connection to the mobile terminal as Client, by using Wi-Fi Protected Setup (WPS) defined by Wi-Fi Alliance. Thus, the parameter is shared between the printing device and the mobile terminal in step S103. Then, a secure connection is established by using the parameter in step S104.

Once the secure connection is established, addressing is performed to establish IP communications between the printing device and the mobile terminal in step S105. Here, the printing device as Group Owner operates as a dynamic host configuration protocol (DHCP) server and provides an IP address to the mobile terminal as Client.

Through the processing described above, wireless communications between the printing device and the mobile terminal are established. The wireless communications enable the printing device and the mobile terminal to directly communicate with one another without employing a separately prepared access point. Japanese Patent Application Laid-Open No. 2012-199884 discusses a technique of transmitting and receiving sound or photo data by using Wi-Fi Direct described above.

In some cases, a predefined port permitted to be used for communications (permitted port) is set in an information processing apparatus, such as a printing device or a PC, to achieve higher security. In such an information processing apparatus, the processing of data is prohibited if a port used in the communications is not the permitted port. Thus, the security of the information processing apparatus can be improved.

However, when the mobile terminal transmits data to the printing device by using Wi-Fi Direct as illustrated in FIG. 1, the mobile terminal may not necessarily designate the permitted port of the printing device to transmit the data to the printing device. For example, when the mobile terminal is set in advance to designate a port other than the permitted port of the printing device, the data transmitted from the mobile terminal is not processed in the printing device.

SUMMARY OF THE INVENTION

Thus, the present invention is directed to a technique of permitting the processing of data received from an external apparatus if a specific condition is satisfied, even when a port designated by the external apparatus for communications is not a permitted port of an information processing apparatus.

According to an aspect of the present invention, an information processing apparatus, in which a first port, through which a communication is permitted, and a second port, through which a communication is permitted when a specific condition is satisfied, are set, includes a reception unit configured to receive data transmitted from an external apparatus, a determination unit configured to determine whether the data satisfies the specific condition when a port used by the reception unit to receive the data is the second port, and a control unit configured to permit processing of the data received by the reception unit when the reception unit receives the data by using the first port or when the determination unit determines that the data satisfies the specific condition, and to prohibit the processing of the data when the reception unit receives the data by using a port that is not either the first port or the second port, or when the determination unit determines that the data does not satisfy the specific condition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram illustrating a hardware configuration of a printing device.

FIGS. 4A and 4B are each a diagram illustrating a port setting screen.

FIG. 7 is a flowchart illustrating processing performed by a printing device in a second exemplary embodiment.

DESCRIPTION OF THE EMBODIMENTS

Various exemplary embodiments, features, and aspects of the invention will be described in detail below with reference to the drawings.

Exemplary embodiments described below shall not be construed as limiting the present invention and, further, not all of the combinations of the features described in the exemplary embodiments are essential to the present invention.

Figure 1:
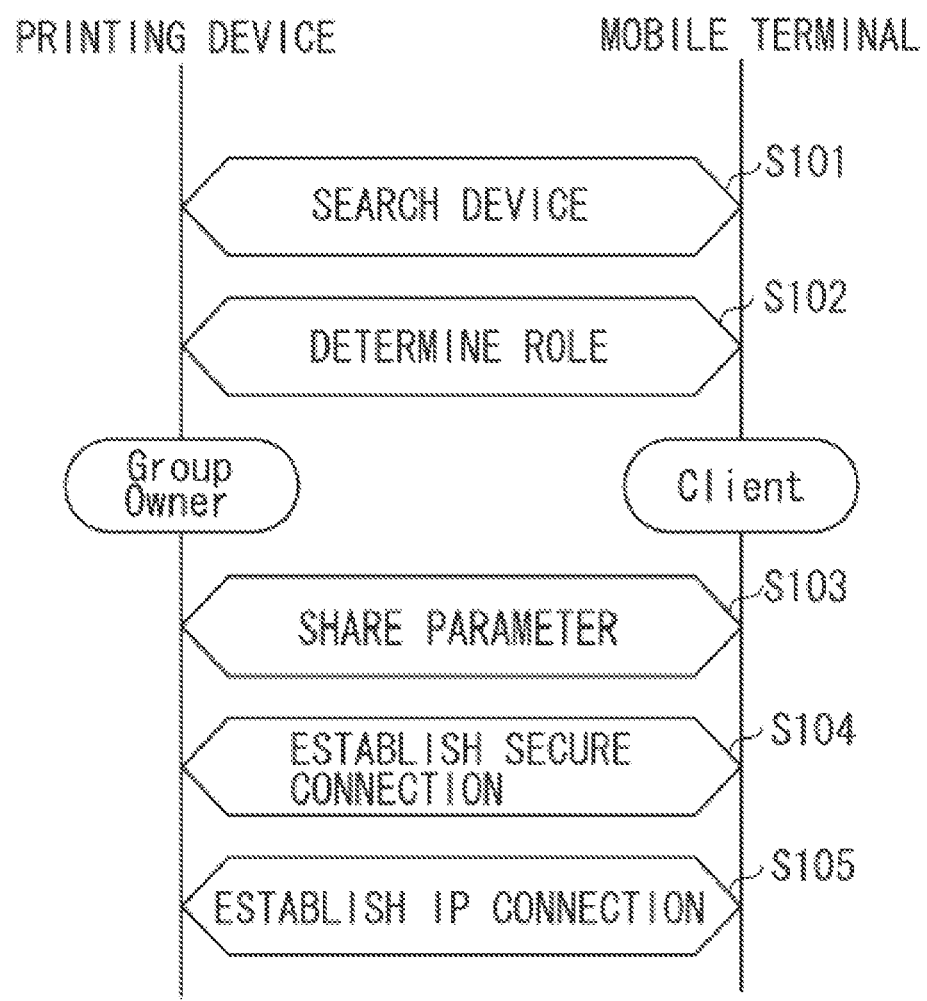
FIG. 1 is a diagram illustrating a processing sequence in Wi-Fi Direct.
Figure 2:
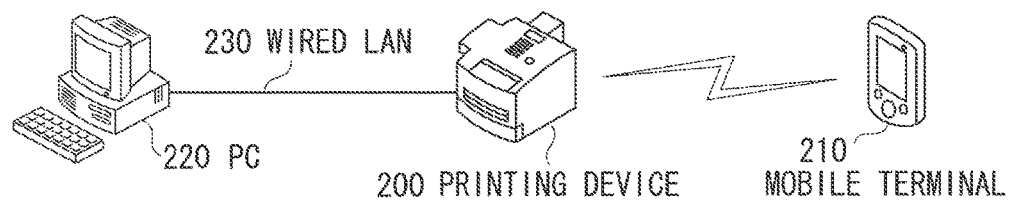
FIG. 2 is a diagram illustrating a configuration of a printing system.

FIG. 2 is a diagram illustrating an entire configuration of a printing system according to a first exemplary embodiment.

A printing device 200 and a mobile terminal 210 are configured to communicate with one another through wireless communications such as Wi-Fi Direct for example. The printing device 200 is an example of an information processing apparatus that is capable of communicating with an external apparatus, such as the mobile terminal 210 or a personal computer (PC) 220. The present invention can be also applied to devices such as PCs, smartphones, mobile phones, tablets, or digital cameras. In the present exemplary embodiment, the printing device 200 is described as a multifunction peripheral (MFP). However, the printing device 200 may be a printer having no scanner.

The mobile terminal 210 is configured to transmit print data to the printing device 200 through the wireless communication such as Wi-Fi Direct. The mobile terminal 210 is a device such as a smartphone, a mobile phone, a tablet, or a digital camera.

The printing device 200 is also capable of communicating with the PC 220 through a wired local area network (LAN) 230. The PC 220 is capable of transmitting print data to the printing device 200 through the wired LAN 230.

In the present exemplary embodiment, a permitted port, through which communications are permitted (80th port for example), is registered in the printing device 200 in advance through a port setting screen 400 in FIG. 4. The PC 220 is set to designate the permitted port of the printing device 200, and then communicate with the printing device 200. The mobile terminal 210 designates a port (600th port for example), which is not the permitted port of the printing device 200, and then communicates with the printing device 200.

FIG. 3 is a diagram illustrating a hardware configuration of the printing device 200.

A control unit 301 including a central processing unit (CPU) 302 controls operations of the entire printing device 200. The CPU 302 reads a control program stored in a read only memory (ROM) 304, and performs various controls such as a communication control. A random access memory (RAM) 303 is used as a temporary area such as a main memory or a work area. A hard disk drive (HDD) 305 stores therein data, various programs, or various information tables.

A printer I/F 306 connects the control unit 301 with a printer 307 (printer engine). The printer 307 performs printing processing on a sheet fed from a sheet feeding cassette (not illustrated), based on the print data received through the printer I/F 306.

A scanner I/F 308 connects the control unit 301 with a scanner 309. The scanner 309 reads a document placed on a platen, and generates image data. The image data generated by the scanner 309 is printed by the printer 307, stored in the HDD 305, or transmitted to the external apparatus through a wireless LAN I/F 312 or a wired LAN I/F 313.

According to an aspect of the present invention, a printing apparatuses which performs printing processing based on print data, and has a direct wireless communication function includes a wired interface configured to receive print data, a wireless interface configured to receive print data by a wireless communication by the direct wireless communication function, and a control unit configured to apply, as a condition of a port which can be used in a communication including receiving of print data, a first port condition to a communication by the wired interface, and apply a second port condition to a wireless communication by the direct wireless communication function.

The wireless LAN I/F 312 performs wireless communications with an external apparatus such as a mobile terminal or a PC. The printing device 200 receives the print data from the external apparatus through the wireless communication, and the printer 307 executes printing processing based on the received print data. Furthermore, through the wireless LAN I/F 312, the image data generated by the scanner 309 can be transmitted to the external apparatus.

The wired LAN I/F 313 is connected to a LAN cable (not illustrated), and is configured to communicate with an external apparatus (not illustrated).

In the printing device 200, a single CPU 302 uses a single memory (RAM 303) to execute operations in a flowchart. However, the present invention is not limited to this configuration. For example, the operations in the flowchart may be executed by operating a plurality of CPUs and memories in cooperation.

The port setting screen 400 in FIG. 4A is a screen displayed on the operation panel 311 of the printing device 200. A user is able to set a specific port of the printing device 200 through which the communication is permitted (hereinafter referred to as the permitted port), by using the port setting screen 400.

The number of the port set as the permitted port is displayed in an item 401. In the port setting screen 400, the 80th port is designated as the permitted port. While a single port is set as the permitted port in the port setting screen 400, a plurality of ports may alternatively be set as the permitted ports. To change the setting of the permitted port (add or delete a permitted port), the user presses an icon 402.

When the user presses the icon 402, the operation panel 311 displays the port setting screen 410 illustrated in FIG. 4B. When the user inputs a permitted port into the item 411 to change the port, and presses the icon 412, the port input to the item 411 is reflected on the item 401. Then, when the user presses the icon 403, the port number displayed in the item 401 is stored in a memory such as the HDD 305, as the permitted port of the printing device 200.

In the present exemplary embodiment, any user is allowed to perform the setting on the port setting screen 400. Alternatively, a user authentication function may be installed in the printing device 200 so that only a specific user (for example, a user with an administrator authority) is allowed to perform the setting on the port setting screen 400.

Figure 5:
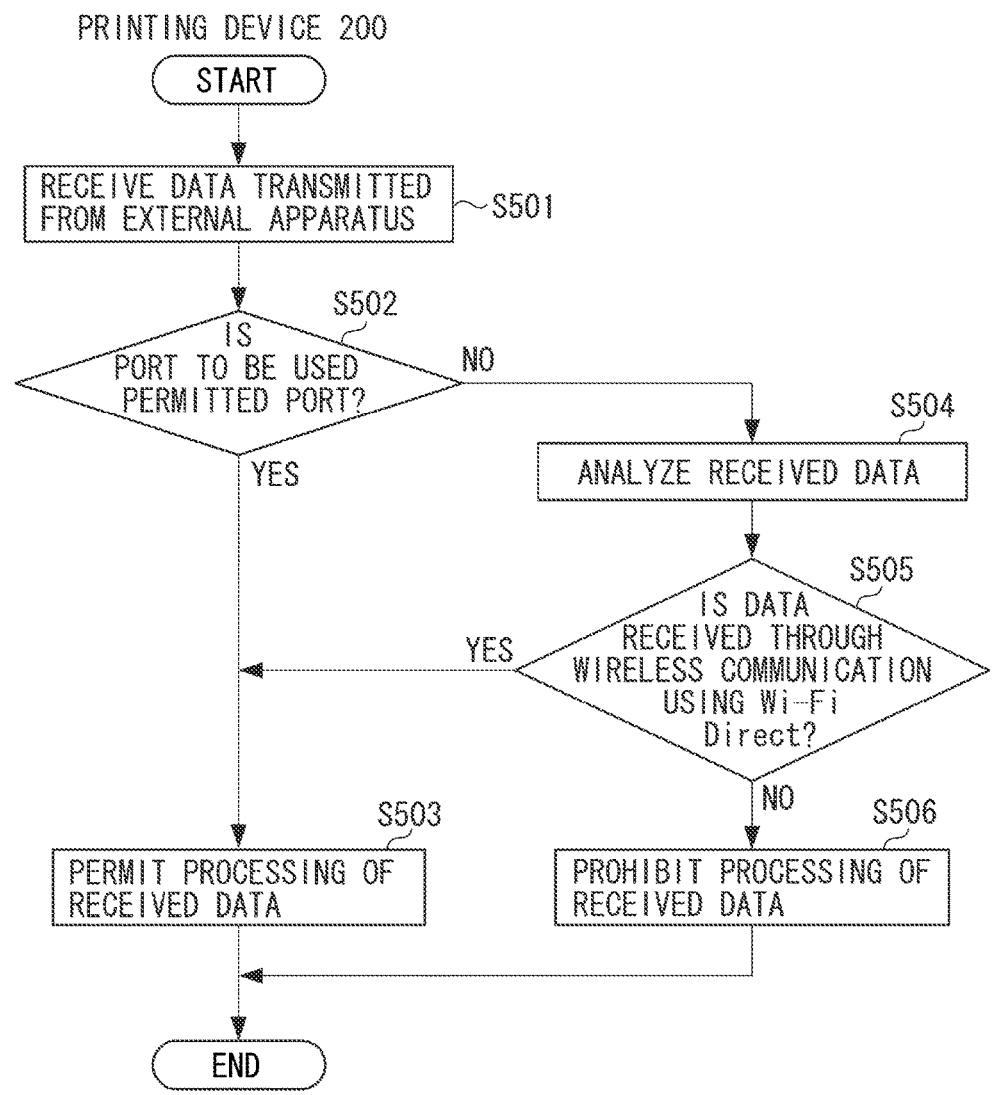
FIG. 5 is a flowchart illustrating processing performed by the printing device in a first exemplary embodiment.

Next, processing performed when the printing device 200 receives the data transmitted from the external apparatus will be described by referring to flowchart in FIG. 5. Steps in the flowchart in FIG. 5 are carried out by the CPU 302 loading a program stored in a memory such as the ROM 304 into the RAM 303 and executing the program.

First, in step S501, the wireless LAN I/F 312 or the wired LAN I/F 313 receives the print data transmitted from the external apparatus. The print data received by the wireless LAN I/F 312 is transmitted from the mobile terminal 210 through a wireless communication established by using Wi-Fi Direct. On the other hand, the print data received by the wired LAN I/F 313 is transmitted from the PC 220 through the wired LAN 230.

Next, in step S502, the CPU 302 determines whether a port to be used for the communications, is a port set as the permitted port. In the present exemplary embodiment, the 80th port is assumed to be set as the permitted port on the port setting screen 400 in advance. When the printing device 200 receives the data transmitted from the external apparatus, a port to be used for the communications is assumed to have been set in the external apparatus in advance. When the CPU 302 determines in step S502 that the port to be used for the communications, is the port set as the permitted port, the processing proceeds to step S503. When the CPU 302 determines in step S502 that the port to be used for the communications, is not the port set as the permitted port, the processing proceeds to step S504.

Next, step S503 will be described. In step S503, the CPU 302 permits processing of data received in step S501. If the data received in step S501 is the print data for example, the CPU 302 controls the printer 307 to execute printing processing based on the print data.

Next, step S504 will be described. In step S504, the CPU 302 analyzes the received data. In step S505, the CPU 302 determines whether the data received in step S501 is data received through the communication using Wi-Fi Direct based on the result of the analysis in step S504. For example, when the result of the analysis in step S504 indicates that a predetermined character string (character string indicating Wi-Fi Direct for example) is included in a header portion of the received data, the CPU 302 determines that the data has been received through the wireless communications using Wi-Fi Direct in step S505, and the processing proceeds to step S503.

When the result of the analysis in step S504 indicates that the predetermined character string is not included in the header portion of the received data, the CPU 302 determines that the data has not been received through the wireless communications using Wi-Fi Direct, and the processing proceeds to step S506. For example, the result of the determination in step S505 is No when the PC 220 transmits the data designated for a port that is not the permitted port, to the printing device 200 through the wired LAN 230. Further, the result of the determination in step S505 is No also when the mobile terminal 210 transmits the data designated for a port that is not the permitted port to the printing device 200, through an access point (not illustrated) (wireless communication not using Wi-Fi Direct).

In step S506, the CPU 302 prohibits the processing of data received in step S501. For example, even when the data received in step S501 is the print data, the CPU 302 controls the printing device 200 not to execute the printing processing based on the print data, and thus discards the received print data. The external apparatus may be notified of an error when the CPU 302 controls the printing device 200 not to execute the printing processing in step S506.

As described above, in the present exemplary embodiment, even when the port used in the communication is not the permitted port, the processing of the received data is permitted when a specific condition is satisfied (if the data is received through the wireless communication using Wi-Fi Direct in the case of FIG. 5). Thus, the printing device 200 can process the data received from the mobile terminal 210, even when the communication is performed without designating the permitted port of the printing device 200 in the mobile terminal 210.

In the first exemplary embodiment, whether the specific condition is satisfied is determined by analyzing the received data when the port used in the communication is determined not to be the permitted port (steps S504 and S505 in FIG. 5). However, if all the received data is analyzed when the port used in the communication is determined not to be the permitted port, a large load is imposed on the CPU 302. Thus, the speed of the communication with an external apparatus might be lowered. Thus, a second exemplary embodiment provides a mechanism for reducing the load on the CPU 302. The configuration of the printing device 200 is the same as the first exemplary embodiment (configuration described in FIG. 3), and thus will not be described.

Figure 6A:
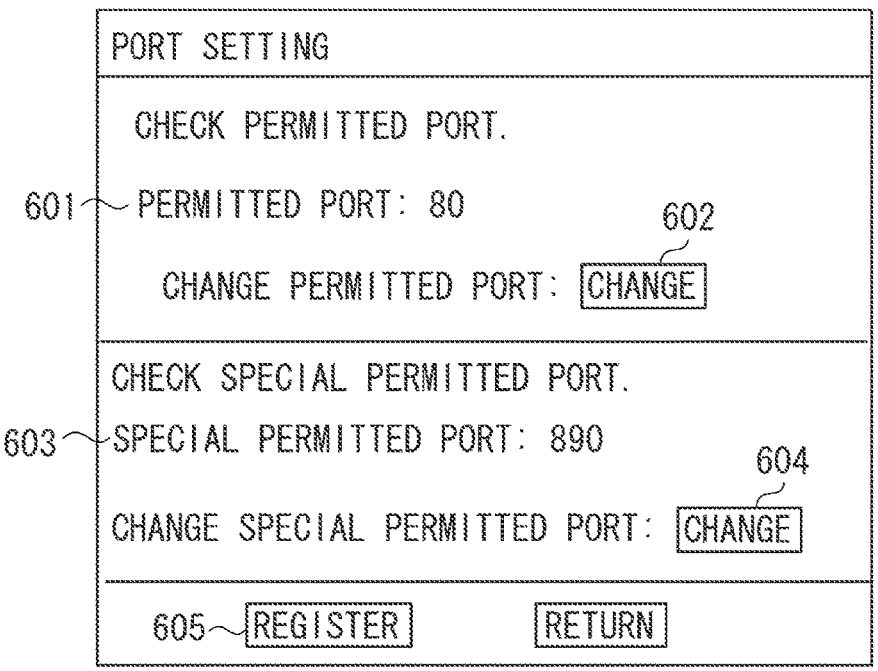
FIGS. 6A and 6B are each a diagram illustrating a port setting screen.

A port setting screen 600 in FIG. 6A is a screen displayed on the operation panel 311 of the printing device. In the port setting screen 600, a specific port, through which communications are permitted when a specific condition is satisfied (hereinafter referred to as special permitted port), can be set in addition to the permitted port described with reference to FIG. 4.

The number of the port set as the permitted port is displayed in an item 601. To change the setting of the permitted port (add or delete a permitted port), the user presses an icon 602. These operations are the same as performed in the port setting screen 400. The screen displayed by pressing the icon 602 is similar to the port setting screen 410 in FIG. 4B.

The number of the port set as the special permitted port is displayed in an item 603. In the port setting screen 600, the 890th port is designated as the special permitted port. However, a plurality of ports may be set as the special permitted ports. To change the setting of the special permitted port (add or delete a special permitted port), the user presses an icon 604.

Figure 6B:
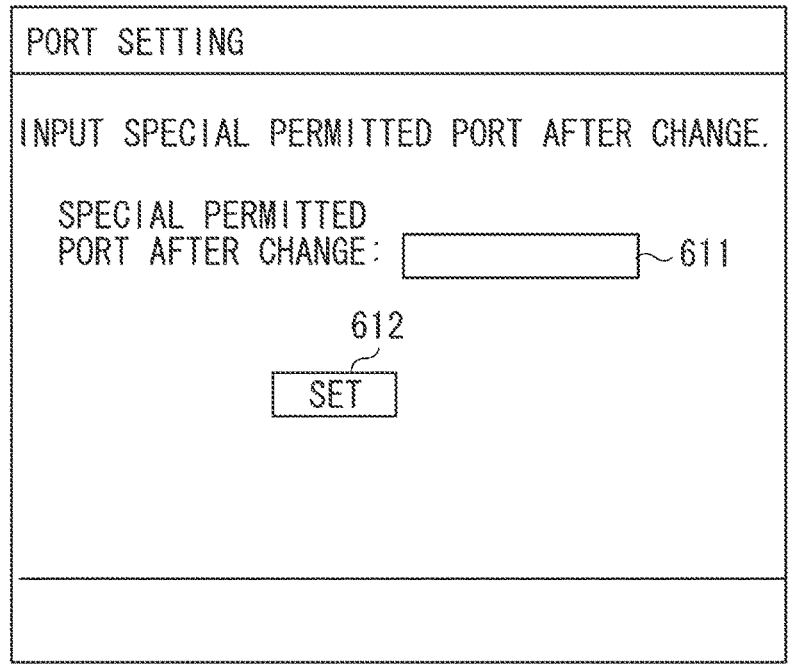

When the user presses the icon 604, the operation panel 311 displays the port setting screen 610 illustrated in FIG. 6B. When the user inputs a special permitted port after the change in the item 611 is made, and presses the icon 612, the port input to the item 611 is reflected on the item 603. Then, when the user presses an icon 605, the port number displayed on the item 601 is stored in a memory such as the HDD 305 as the permitted port of the printing device 200, and the port number displayed on the item 603 is stored in a memory such as the HDD 305 as the special permitted port of the printing device 200.

In the port setting screen 600, the 890th port is designated as the special permitted port. For example, if a port that can be designated has been determined according to the specification of the mobile terminal 210, such a port may be set as the special permitted port.

In the present exemplary embodiment, any user is allowed to perform the setting on the port setting screen 60. Alternatively, a user authentication function may be installed in the printing device 200 so that only a specific user (for example, a user with an administrator authority) is allowed to perform the setting on the port setting screen 600.

Next, operations performed when the printing device 200 receives the data transmitted from the external apparatus will be described by referring to a flowchart in FIG. 7. Steps in the flowchart in FIG. 7 are executed by the CPU 302 loading a program stored in a memory such as the ROM 304 into the RAM 303 and executing the program. Operations of the steps in FIG. 7 denoted with the same number as FIG. 5 are the same as those in the FIG. 5, and thus will not be described in detail.

In step S502, the CPU 302 determines whether a port to be used for the communications, is a port set as the permitted port. When the CPU 302 determines in step S502 that the port to be used for the communications is the port set as the permitted port, the processing proceeds to step S503. When the CPU 302 determines in step S502 that the port to be used for the communications, is not the port set as the permitted port, the processing proceeds to step S701.

In step S701, the CPU 302 determines whether the port to be used for the communications, is a port set as the special permitted port. In the present exemplary embodiment, the special permitted port is set using the port setting screen 600 in advance. When the CPU 302 determines in step S701 that the port to be used for the communications, is the port set as the special permitted port, the processing proceeds to step S504. The processing in and after step S504 is the same as the first exemplary embodiment.

When the CPU 302 determines in step S701 that the port to be used for the communications, is not the port set as the special permitted port, the processing proceeds to step S506 where the CPU 302 prohibits the processing of the data received in step S501. For example, even when the data received in step S501 is the print data, the CPU 302 controls the printing device 200 not to execute the printing processing based on the printing data, and thus discards the received print data. When the CPU 302 determines in step S701 that the port to be used for the communications, is not the port set as the special permitted port, the CPU 302 does not analyze the received data according to step S504, and the processing proceeds to step S506. Thus, in the printing device 200, the load on the CPU 302 can be reduced from the first exemplary embodiment.

As described above, the special permitted port is set in the printing device 200 in addition to the permitted port in this exemplary embodiment. Thus, the analysis of the received data that increases the load on the CPU 302 is less frequently performed. Thus, the load on the CPU 302 can be reduced from the first exemplary embodiment.

So far, the exemplary embodiments where the Wi-Fi Direct is used as the wireless communication have been described. However, the wireless communication is not limited to Wi-Fi Direct. The present invention can be applied to any wireless communications that enable a plurality of communication devices to directly communicate with each other as in Wi-Fi Direct.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even when a port designated by an external apparatus is not a permitted port of an information processing apparatus, processing of data received from the external apparatus can be permitted when a specific condition is satisfied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus which performs printing processing based on print data, and has a Wi-Fi Direct function, the printing apparatus comprising:
   a wired interface;
   a wireless interface that performs a communication by the Wi-Fi Direct function;
   a memory that stores programs; and
   a processor that executes the programs to:
      set both a first permitted port number and a second permitted port number,
      wherein the first permitted port number is a port number that is permitted to be used both in the communication by the Wi-Fi Direct function and in a communication by the wired interface, and
      wherein the second permitted port number is a port number that is permitted to be used in the communication by the Wi-Fi Direct function and not permitted to be used in the communication by the wired interface.

2. The printing apparatus according to claim 1, further comprising a display that displays a setting screen for a user to set both of the first permitted port number and the second permitted port number.

* * * * *